July 15, 1924.

O. E. CLARK

HOISTING MECHANISM

Filed May 25, 1923

1,501,099

Inventor
Omar E. Clark

By
Attorney

Patented July 15, 1924.

1,501,099

UNITED STATES PATENT OFFICE.

OMAR E. CLARK, OF DENVER, COLORADO, ASSIGNOR TO THE DENVER ROCK DRILL MANUFACTURING COMPANY, OF DENVER, COLORADO, A CORPORATION OF DELAWARE.

HOISTING MECHANISM.

Application filed May 25, 1923. Serial No. 641,415.

*To all whom it may concern:*

Be it known that I, OMAR E. CLARK, a citizen of the United States, residing at Denver, in the county of Denver and State of Colorado, have invented certain new and useful Improvements in Hoisting Mechanism, of which the following is a specification.

The object of the present invention is to provide a simple automatic clutch of a novel character for coupling either of a pair of drums to a driving shaft, according to the direction in which the shaft is rotated.

In the accompanying drawings:—

Figure 1:
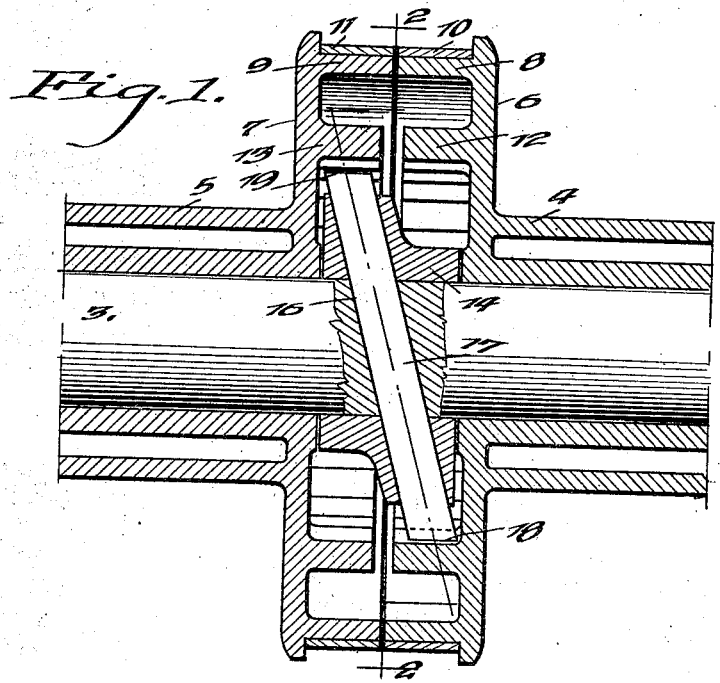
Figure 2:
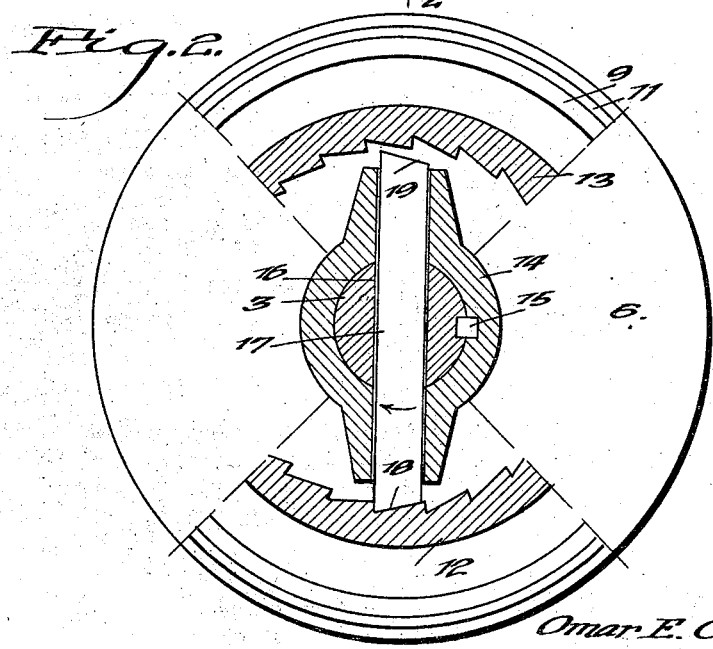

Figure 1 is a longitudinal sectional view through a portion of two drums on a driving shaft and illustrating the clutch mechanism, Figure 2 is a sectional view on the line 2—2 of Figure 1.

In the embodiment disclosed the driving shaft is designated 3, and is adapted to be rotated in opposite directions by any suitable motor. Surrounding said shaft are independent drums 4 and 5 having adjacent heads 6 and 7. These heads are flanged as illustrated at 8 and 9, the peripheries of the flanges constituting braking surfaces on which act brake bands 10 and 11. The flanges 8 and 9 form a housing, and each head is provided with a clutch element in the form of a ring of beveled ratchet teeth 12 and 13, the teeth of one drum being disposed reversely to the teeth of the other.

The shaft 3 carries a head 14 suitably keyed thereto as illustrated at 15 and housed within the drum heads. This head and the shaft are provided with a diagonally disposed guideway 16. A reciprocatory pawl member in the form of a bar 17, is slidable in the guideway and terminates in pawl teeth 18 and 19, the tooth 18 being adapted to interlock with the teeth 12 of one drum, and the tooth 19 being adapted to interlock with the teeth 13 of the other drum. The length of the pawl 17 is slightly less than the distance between the base of the diametrically opposite teeth 12 and 13 so that the pawl is capable of slight longitudinal movement, and when one of its terminal teeth is interlocked with one of the coacting ring of teeth the other will be free therefrom, as indicated by reference to Figure 2.

With this construction, it will be evident that if the shaft 13 is rotated in the direction indicated by the arrow in Figure 2, the tooth 18 will engage one of the teeth 12, and consequently the drum 4 will be locked to the shaft 3, so that said drum will rotate with said shaft while the other drum 5 will be free therefrom. If the direction of rotation of the shaft 3 is reversed the beveled side of the tooth 18 will ride against the beveled faces of the teeth 12, thereby causing the pawl bar 17 to move longitudinally and carry the tooth 19 into interlocking engagement with one of the teeth 13. As a consequence the other drum 5 will now be locked to the shaft 3 while the drum 4 will be released.

From the foregoing, it is thought that the construction, operation and many advantages of the herein described invention will be apparent to those skilled in the art, without further description, and it will be understood that various changes in the size, shape, proportion and minor details of construction, may be resorted to without departing from the spirit or sacrificing any of the advantages of the invention.

Having thus fully described my invention, what I claim as new, and desire to secure by Letters Patent, is:—

1. An automatic reversible hoist including a driving shaft, drums loosely rotatable with respect to the shaft, reversely disposed clutch elements carried by the drums, and a clutch member that extends transversely of the shaft and has portions on opposite sides of the same that respectively, alternately and automatically engage with the clutch elements of the drums to rotate one drum in one direction and the other drum in the other direction when the shaft is correspondingly rotated.

2. An automatic reversible hoist including a driving shaft, drums loosely rotatable with respect to the shaft, reversely disposed rings of beveled ratchet teeth respectively mounted on the drums, and a reciprocatory clutch pawl mounted transversely on the shaft and having terminal teeth respectively, alternately and automatically engaging with the teeth of the drums on opposite sides of the shaft to rotate one of the drums in one direction and the other drum in the other direction when the shaft is correspondingly rotated.

3. An automatic reversible hoist including a driving shaft, drums loosely rotatable with respect to the shaft, reversely disposed rings of beveled ratchet teeth respectively mounted on the drums, a head fixed to the shaft, said head and shaft having a diagonally disposed guideway, and a pawl bar mounted to reciprocate in the guideway and terminating in pawl teeth that respectively, alternately and automatically engage with the teeth of the drums on opposite sides of the shaft to rotate one of the drums in one direction and the other drum in the opposite direction when the shaft is correspondingly rotated.

In testimony whereof, I affix my signature in the presence of two witnesses.

OMAR E. CLARK.

Witnesses:
 D. B. SEELEY,
 J. H. EAST, Jr.